US008267536B2

(12) United States Patent  (10) Patent No.: US 8,267,536 B2
Hayashi  (45) Date of Patent: Sep. 18, 2012

(54) POWER SUPPLY UNIT AND DISPLAY DEVICE

(75) Inventor: Keiji Hayashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 367 days.

(21) Appl. No.: 12/663,101

(22) PCT Filed: Mar. 19, 2008

(86) PCT No.: PCT/JP2008/000660
§ 371 (c)(1),
(2), (4) Date: Dec. 4, 2009

(87) PCT Pub. No.: WO2009/008112
PCT Pub. Date: Jan. 15, 2009

(65) Prior Publication Data
US 2010/0172126 A1    Jul. 8, 2010

(30) Foreign Application Priority Data
Jul. 11, 2007  (JP) .................................. 2007-182097

(51) Int. Cl.
G02F 1/13357  (2006.01)
F21V 29/00    (2006.01)

(52) U.S. Cl. ....... 362/97.1; 362/97.2; 362/561; 362/294

(58) Field of Classification Search ........ 362/97.1–97.4, 362/561, 294
See application file for complete search history.

(56) References Cited

U.S. PATENT DOCUMENTS

| 5,993,027 A | 11/1999 | Yamamoto et al. |
| 7,223,003 B2* | 5/2007 | Kim .............................. 362/561 |
| 7,255,462 B2* | 8/2007 | Tseng ........................... 362/330 |
| 7,281,812 B2* | 10/2007 | Kim ............................. 362/97.1 |
| 2005/0057946 A1* | 3/2005 | Kim .............................. 362/561 |
| 2007/0018557 A1 | 1/2007 | Fujiwara et al. |

FOREIGN PATENT DOCUMENTS

| CN | 1900789 A | 1/2007 |
| JP | 10-054985 A | 2/1998 |
| JP | 2000-267096 A | 9/2000 |
| JP | 2000-321691 A | 11/2000 |
| JP | 2004-022246 A | 1/2004 |
| JP | 022246 A * | 1/2004 |
| JP | 2006-058679 A | 3/2006 |
| JP | 2006-318668 A | 11/2006 |
| JP | 2007-042317 A | 2/2007 |
| WO | 2006/134735 A1 | 12/2006 |

OTHER PUBLICATIONS

Official Communication issued in corresponding Chinese Patent Application No. 200880018904.X, mailed on Feb. 24, 2011.
Official Communication issued in International Patent Application No. PCT/JP2008/000660, mailed on May 20, 2008.

* cited by examiner

*Primary Examiner* — Stephen F Husar
*Assistant Examiner* — James Cranson, Jr.
(74) *Attorney, Agent, or Firm* — Keating & Bennett, LLP

(57) ABSTRACT

A light source unit includes a chassis, a light diffuser disposed to face the chassis, a light source disposed between the light diffuser and the chassis, and an air passage through which air for cooling the light source flows. The light source is disposed inside the air passage, whereas the light diffuser is disposed outside the air passage. At least a portion of the air passage is partitioned by a partition transparent to light of the light source.

9 Claims, 6 Drawing Sheets

POWER SUPPLY UNIT AND DISPLAY DEVICE

BACKGROUND OF THE INVENTION

1. Field of the Invention

The present invention relates to light source units and display devices, and specifically to cooling light source units.

2. Description of the Related Art

In recent years, for example, as display screens for television sets, computers, etc., flat type display devices such as liquid crystal display devices have been used widely. For example, liquid crystal display devices for transmissive display include a liquid crystal display panel, and a light source unit (also referred to as a backlight unit) disposed on a back surface side of the liquid crystal display panel. Thus, light output from the light source unit is transmitted through the liquid crystal display panel so that desired images are displayed.

For example, in the case of large, liquid-crystal television sets, etc., a so-called direct-backlight structure is often employed for a light source unit. That is, the direct-backlight light source unit includes a reflection sheet and a plurality of light sources disposed in a chassis, and a light diffuser disposed to face the plurality of light sources. Moreover, the light diffuser faces a liquid crystal display panel. On a side of the light diffuser close to the liquid crystal display panel, a plurality of optical sheets is disposed in a stacked manner. It is known that, as the light sources, for example, cold cathode fluorescent lamps (CCFLs), hot cathode fluorescent lamps (HCFLs), light-emitting diodes (LEDs), or the like are used.

When the light source unit is continuously used, heat of the light sources may increase the temperature in the light source unit during use of a display device. The heat may cause faulty operation of electronic circuit components provided in the light source unit, or may change the electro-optical characteristics of liquid crystals of the liquid crystal display panel, which may reduce the reliability of the device.

Thus, it has been conventionally proposed to cool the light source unit by air (for example, see Japanese Patent Publication No. 2006-58679 and Japanese Patent Publication No. H10-106342). Japanese Patent Publication No. 2006-58679 discloses a cooling air passage provided on a further back surface side of a chassis. Moreover, Japanese Patent Publication No. H10-106342 discloses that a reflective plate is disposed on a back surface side of light sources to form an air passage by space between the reflective plate and a chassis.

However, in Japanese Patent Publication No. 2006-58679 and Japanese Patent Publication No. H10-106342, the air passage is provided separately from and independently of spaces in which the light sources are disposed, so that the light sources serving as heat sources cannot be cooled directly. Therefore, it is difficult to increase cooling efficiency of the light source unit.

For example, the luminous efficiency of cold cathode fluorescent tubes or hot cathode fluorescent lamps reaches its peak in a predetermined temperature range, but if the temperature rises above the predetermined temperature range, the luminous efficiency continues lowering. Moreover, the luminous efficiency of LEDs lowers as the temperature rises. Therefore, in order to maintain the luminance of the light source unit, it is very important to appropriately control its temperature rise.

SUMMARY OF THE INVENTION

In view of the problems discussed above, preferred embodiments of the present invention provide a light source unit which has an increased cooling efficiency, and in which output light is less degraded.

In a preferred embodiment of the present invention, a light source is disposed inside an air passage at least a portion of which is partitioned by a partition, whereas a light diffuser is disposed outside the air passage.

Specifically, a light source unit according to a preferred embodiment of the present invention includes: a chassis; a light diffuser disposed to face the chassis; a light source disposed between the light diffuser and the chassis; and an air passage through which air for cooling the light source flows, wherein the light source is disposed inside the air passage, whereas the light diffuser is disposed outside the air passage, and at least a portion of the air passage is partitioned by a partition transparent to light of the light source.

The air passage may be partitioned by the partition and the chassis.

The air passage may be partitioned by the partition formed in a tubular shape.

The light source unit may include multiple light sources, wherein multiple partitions are provided for respective ones of the light sources.

It is preferable that the light source includes a cylindrical lamp, and that the partition includes a sheet material extending in a direction of an axis parallel or substantially parallel to an axis of the light source with the sheet material being curved around the axis parallel or substantially parallel to the axis of the light source.

It is preferable that the light source includes a cylindrical lamp, and that the partition includes a cylindrical sheet material extending in an axial direction of the light source.

It is desirable that the light diffuser is disposed to face a polarizer attached to a display panel, and that the axes of the light source and the partition are perpendicular or substantially perpendicular to a transmission axis of the polarizer.

Moreover, it is preferable that the light source unit includes: a polarization-reflection-type selective reflection sheet disposed to face the light diffuser, wherein a transmission axis of the polarization-reflection-type selective reflection sheet is perpendicular or substantially perpendicular to the axes of the partition and the light source.

Moreover, a display device according to a preferred embodiment of the present invention includes: a display panel; and a light source unit disposed to face the display panel, wherein the light source unit includes a chassis, a light diffuser disposed to face the chassis, a light source disposed between the light diffuser and the chassis, and an air passage through which air for cooling the light source flows, the light source is disposed inside the air passage, whereas the light diffuser is disposed outside the air passage, and at least a portion of the air passage is partitioned by a partition transparent to light of the light source.

The air passage may be partitioned by the partition and the chassis.

The air passage may be partitioned by the partition formed in a tubular shape.

The display device may include multiple light sources, wherein multiple partitions are provided for respective ones of the light sources.

It is preferable that the light source includes a cylindrical lamp, and that the partition includes a sheet material extending in a direction of an axis parallel or substantially parallel to an axis of the light source with the sheet material being curved around the axis parallel or substantially parallel to the axis of the light source.

It is preferable that the light source includes a cylindrical lamp, and that the partition includes a cylindrical sheet material extending in an axial direction of the light source.

It is desirable that the display panel includes a polarizer attached to a surface of the display panel facing the light diffuser, and that the axes of the partition and the light source are perpendicular or substantially perpendicular to a transmission axis of the polarizer.

The inventor made an intensive study of a cooling structure of a light source unit. As a result, the inventor discovered that a major cause of degradation of output light (e.g., degradation of display images in the case of a display device including the light source unit) caused by dust in cooling air is the adhesion of the dust to a light diffuser rather than to a light source.

Thus, in a light source unit according to a preferred embodiment of the present invention, the light source is disposed between the chassis and the light diffuser, and light output from the light source is transmitted and diffused through the light diffuser. That is, the light source unit outputs the diffused light. When the light source unit continues outputting light, the light source unit itself is heated by the light source.

To avoid this, the light source unit according to a preferred embodiment of the present invention is provided with the air passage, in which the light source is disposed. Therefore, the light source is cooled directly and efficiently by air flowing through the air passage. Meanwhile, the light diffuser is disposed outside the air passage, and thus, even if the air flowing through the air passage contains dust, the dust is trapped within the air passage, as a result of which the dust does not adhere to the light diffuser.

Therefore, the dust contained in the air for cooling the light source is trapped apart from the light diffuser close to a user, so that the dust can be inconspicuous for the user. Furthermore, the cooling efficiency of the light source is increased, as a result of which the temperature of the light source appropriately lowers, thereby increasing the luminous efficiency of the light source.

The air passage can be partitioned by a partition and a chassis, or can also be partitioned by a partition formed in a tubular shape. For example, all of a plurality of light sources can be disposed inside one air passage, or a plurality of light sources can be individually disposed in air passages.

In particular, when the light source includes a cylindrical lamp, it is preferable that the partition is made of a sheet material extending in a direction of an axis parallel or substantially parallel to an axis of the light source with the sheet material being curved around the axis parallel or substantially parallel to the axis of the light source. That is, since the axis of the light source and the axis of the partition are arranged in the same direction, polarized light output from the cylindrical lamp can be transmitted efficiently through the partition.

Moreover, in this case, when the axes of the partition and the light source are perpendicular or substantially perpendicular to the transmission axis of the polarizer of the display panel disposed to face the light diffuser, polarized light output from the light diffuser can be transmitted efficiently thorough the polarizer.

Furthermore, in the case where a polarization-reflection-type selective reflection sheet is disposed to face the light diffuser, if the transmission axis of the selective reflection sheet is perpendicular or substantially perpendicular to the axes of the partition and the light source, the transmission axis of the selective reflection sheet is coincident with the transmission axis of the partition. Thus, it is possible to increase the amount of light transmitted through the selective reflection sheet. Moreover, in a display device including the light source unit, light output from the light source unit is controlled by the display panel to display desired images.

According to various preferred embodiments of the present invention, a light source is disposed inside an air passage at least a portion of which is partitioned by a partition, whereas a light diffuser is disposed outside the air passage. This makes it possible to directly cool the light source, and to trap dust contained in air within the air passage apart from the light diffuser. Therefore, it is possible to increase the cooling efficiency of the light source unit, and to reduce degradation of output light of the light source unit.

Other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail below with reference to the drawings. Note that the present invention is not limited to the preferred embodiments below.

Preferred Embodiment 1

FIGS. 1-7 show Preferred Embodiment 1 of the present invention.

Figure 1:
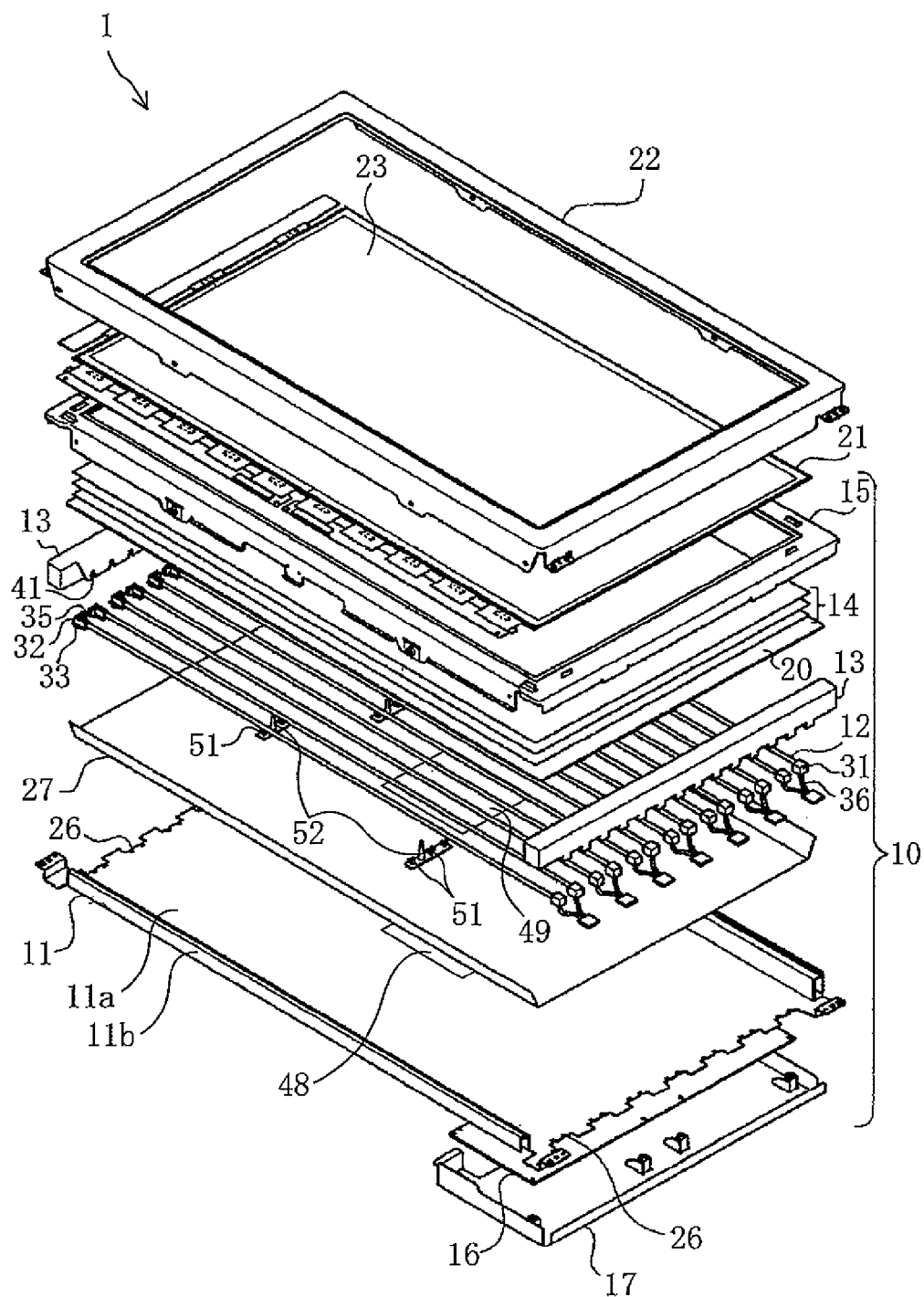
FIG. 1 is an exploded perspective view schematically showing a structure of a liquid crystal display device of a preferred embodiment of the present invention.
Figure 2:
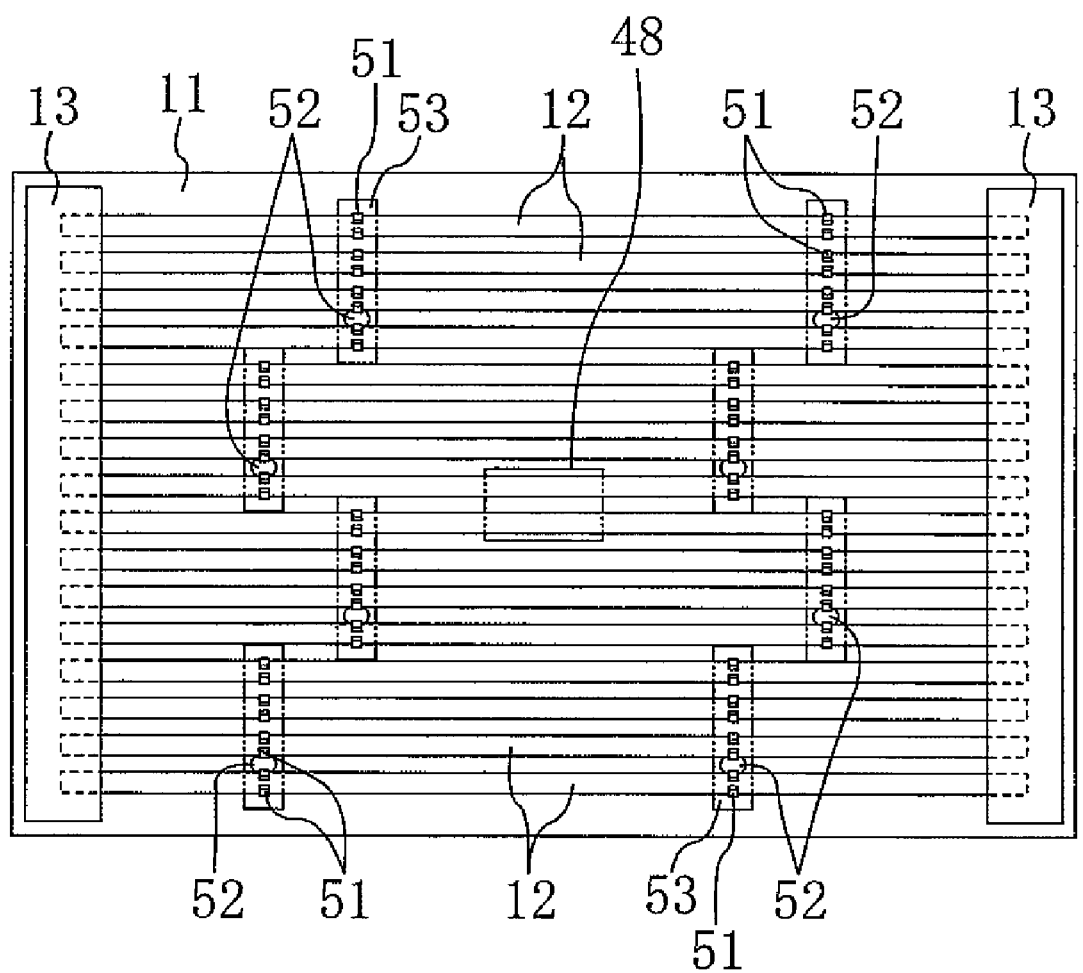
FIG. 2 is a plan view showing the appearance of a backlight unit.
Figure 3:
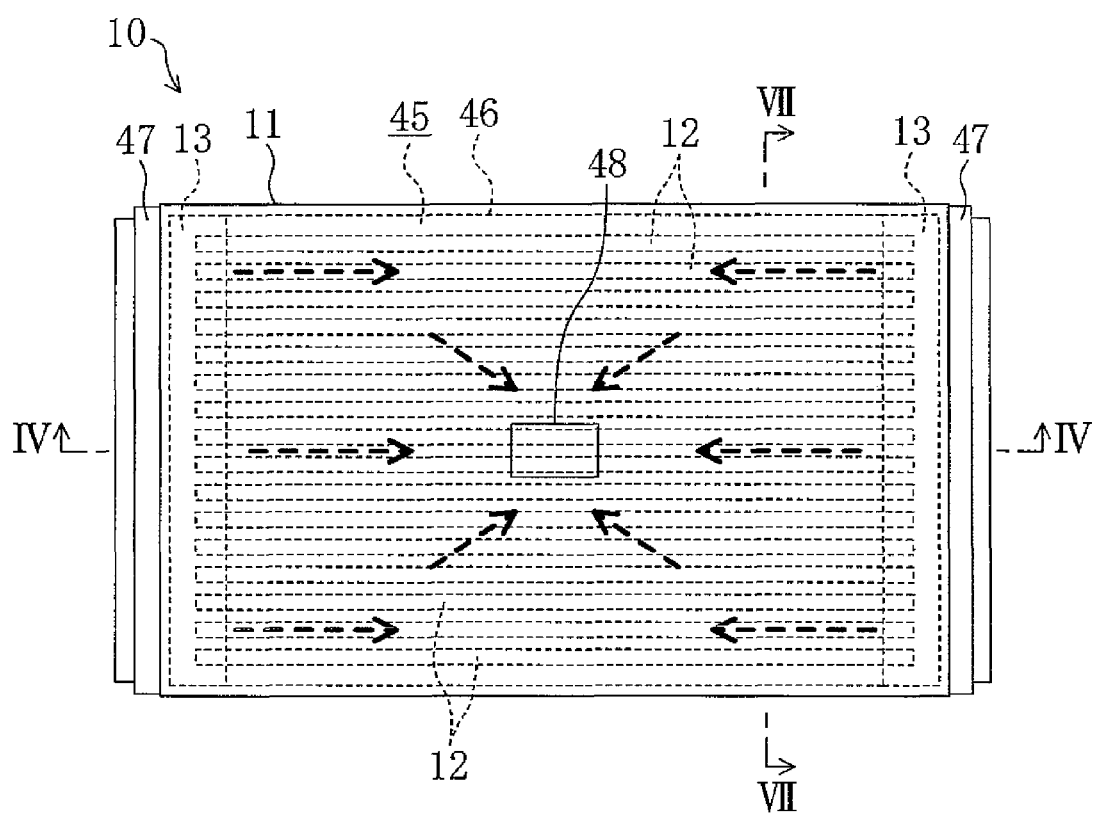
FIG. 3 is a back view showing the appearance of the backlight unit.
Figure 4:
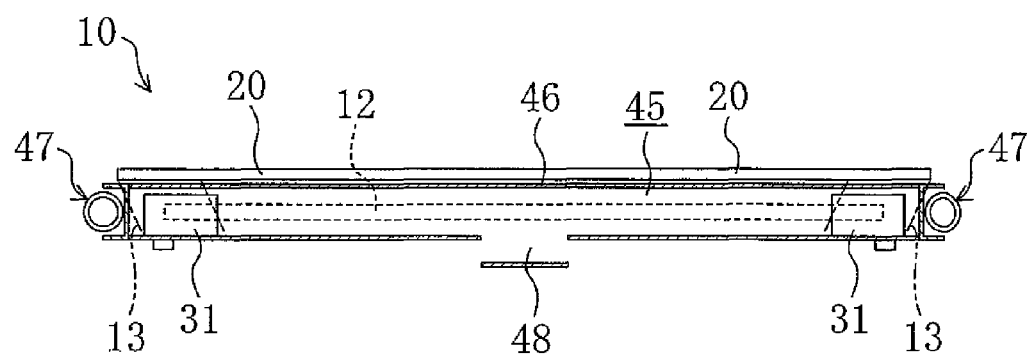
FIG. 4 is a cross-sectional view along the line IV-IV of FIG. 3.
Figure 5:
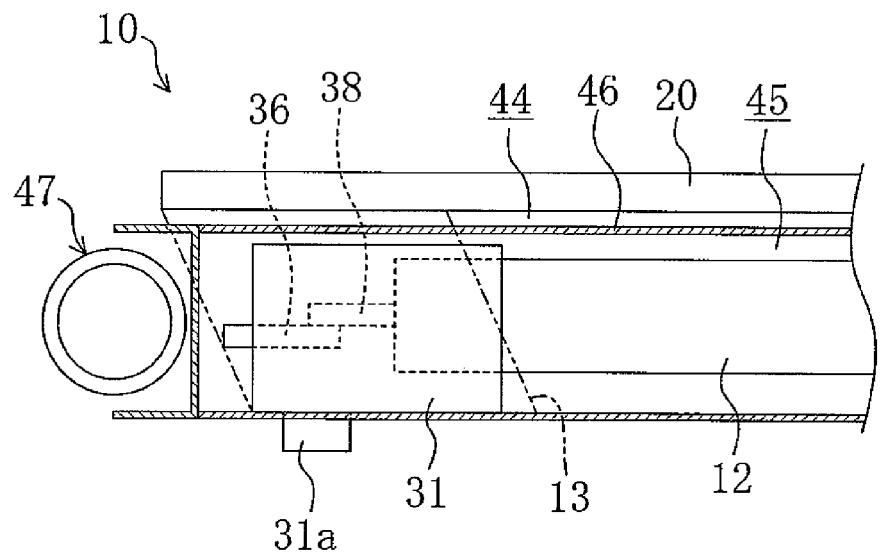
FIG. 5 is an enlarged cross-sectional view showing main components of FIG. 4.
Figure 6:
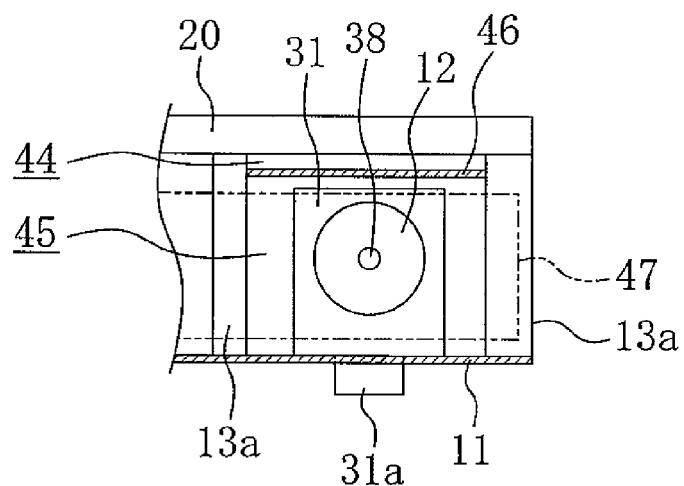
FIG. 6 is an enlarged side view showing a side of the backlight unit, a portion of which is omitted.
Figure 7:
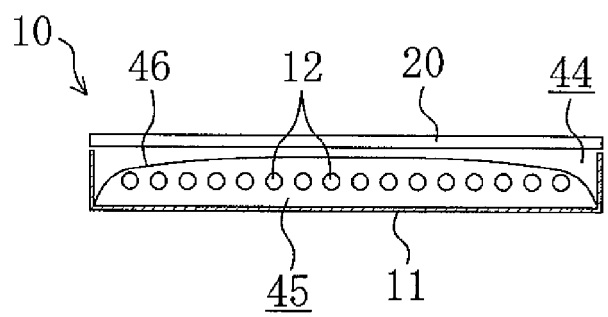
FIG. 7 is a cross-sectional view along the line VII-VII of FIG. 3.

FIG. 1 is an exploded perspective view schematically showing a structure of a liquid crystal display device 1 of the present preferred embodiment. FIG. 2 is a plan view showing the appearance of a backlight unit 10. FIG. 3 is a back view showing the appearance of the backlight unit 10. FIG. 4 is a cross-sectional view along the line IV-IV of FIG. 3. FIG. 5 is an enlarged cross-sectional view showing main components of FIG. 4. FIG. 6 is an enlarged side view of a side of the backlight unit 10, a portion of which is omitted. FIG. 7 is a cross-sectional view along the line VII-VII of FIG. 3.

Note that, in the following description, unless otherwise specified, the upward direction in FIG. 1 is referred to as a front surface side, and the downward direction in FIG. 1 is referred to as a back surface side. Moreover, in FIG. 1, for convenience of description, a diffusion sheet 46 and fans 47 which will be described later are omitted.

In Preferred Embodiment 1, as an example of a display device according to a preferred embodiment of the present invention, the liquid crystal display device 1 will be described. As shown in FIG. 1, the liquid crystal display device 1 includes: a liquid crystal display panel 21 serving as a display panel; and the backlight unit 10 serving as a light source unit disposed to face the liquid crystal display panel 21.

Although not shown, the liquid crystal display panel 21 includes: a TFT substrate on which a plurality of thin film transistors (TFTs) serving as switching elements is provided; a counter substrate facing the TFT substrate; and a liquid crystal layer sealed between the TFT substrate and the counter substrate by a sealing material. The TFT substrate is made of, for example, an active matrix substrate, and includes a driver circuit configured to drive the TFTs, etc. for respective ones of a plurality of pixels disposed in a matrix pattern. On an upper surface (that is, a surface close to a user) and a lower surface (that is, a surface facing a light diffuser 20 which will be described later) of the liquid crystal display panel 21, polarizers 23 are attached as shown in FIG. 1. The transmission axes of the polarizers 23 are orthogonal to each other.

The backlight unit 10 includes: a chassis 11 at least a portion of which has a flat bottom surface; a reflection sheet 27 disposed on the bottom surface of the chassis 11; the light diffuser 20 disposed to face the bottom surface of the chassis 11; and light sources 12 disposed between the light diffuser 20 and the chassis 11.

A configuration of the backlight unit 10 will be described in detail below.

The chassis 11 is a substantially rectangular, flat, plate-shaped member configured to hold the light sources 12, etc. Edges along the long sides of the chassis 11 are bent up to form an angle with respect to the bottom surface 11a, thereby defining a pair of sidewalls 11b. Meanwhile, edges along the short sides of the chassis 11 include reception portions 26 provided at predetermined intervals, where engagement portions 33 of light source holders 31 and 32 attached to end sections of the light sources 12 are configured to be locked into the reception portions 26. The chassis 11 is formed by, for example, pressing a metal plate, or the like.

The reflection sheet 27 is laid on a front surface of the chassis 11. The reflection sheet 27 extends from the bottom surface 11a to both of the sidewalls 11b of the chassis 11. The reflection sheet 27 is a sheet-shaped member configured to diffusely reflect light output from the light sources 12. The reflection sheet 27 is made of, for example, a sheet-shaped expanded polyethylene terephthalate (PET) resin material, or the like. The reflection sheet 27 is formed to have long sides slightly shorter than the long sides of the chassis 11 so that the reception portions 26 of the chassis 11 are not covered with the reflection sheet 27.

The plurality of light sources 12 is disposed on the further front surface side of the reflection sheet 27. As the light sources 12, known light sources can be used. For example, hot cathode fluorescent lamps, xenon lamps, cold cathode fluorescent tubes, hot cathode fluorescent tubes, or the like in a straight tube shape may be used as the light sources 12. As shown in FIGS. 1 and 2, these light sources can be disposed in parallel or substantially in parallel to each other. Moreover, the light sources 12 are attached and fixed to the chassis 11 by holder parts 51 which will be described later.

To the end sections on one side of the light sources 12, electric cables 35 are extended. The electric cables 35 connect adjacent two light sources 12 to each other. To the end sections on the other side of the light sources 12, electric cables 36 are extend to supply electric power to the light sources 12. The electric cables 36 are configured to be connected to a light source driver circuit substrate 16.

The end sections on both sides of the light sources 12 are equipped with the light source holders 31 and 32 which are configured to cover and protect the end sections of the light sources 12, and to allow the end sections of the light sources 12 to be locked into the chassis 11. The light source holders 31 and 32 are made of, for example, a rubber-based material such as silicon rubber, or an elastically deformable material such as a synthetic resin material.

On the further front surface side of the light sources 12, cover members 13 covering the end sections of the light sources 12 are disposed. Each cover member 13 preferably is a substantially pole-like member having an outer shell which is of a generally C-shaped cross-section with its surface close to the chassis 11 being open. Each cover member 13 is made of, for example, a synthetic resin, or the like. On one side surface of the outer shell of each cover member 13, cutouts 41 which are of a generally U-shape, and in which the light sources can be loosely fitted are formed. Therefore, the cover members 13 can be placed to cover the end sections of the light sources 12 disposed on the front surface side of the chassis 11.

On front surfaces of the cover members 13, the light diffuser 20 configured to diffuse light of the light sources 12 is disposed to cover substantially the entirety of the chassis 11. That is, the light diffuser 20 preferably is formed in a rectangular-plate shape, and is made of, for example, a polycarbonate resin, or the like. Note that the light diffuser 20 is configured to convexly curve toward the reflection sheet 27 when the light diffuser 20 is thermally expanded with all components of the backlight unit 10 being assembled.

On the front surface side of the light diffuser 20, optical sheets 14 having the function of adjusting the characteristic of light transmitted through the light diffuser 20 are disposed. The optical sheets 14 preferably are plate-shaped or sheet-shaped members configured to adjust the characteristic of light output from the light sources 12, or preferably include a collection of these members. Examples of the optical sheets 14 include lens sheets, polarization-reflection sheets, etc. which are generally stacked to be used as the optical sheets 14.

On the further front surface side of the optical sheets 14, a frame 15 is placed. The frame 15 is a frame-shaped member having the function of, for example, holding the optical sheets 14 in the chassis 11. The frame 15 preferably has a rectangular-frame shape having an opening, and is formed by, for example, pressing a metal plate material or the like, or is made of a synthetic resin in one piece.

Meanwhile, on the back surface side of the chassis 11, the light source driver circuit substrate 16 configured to drive the light sources 12 is disposed, and a light source driver circuit substrate cover 17 covering the light source driver circuit substrate 16 is placed. The light source driver circuit substrate cover 17 is formed by, for example, pressing a metal plate, or the like.

In the liquid crystal display device 1, the liquid crystal display panel 21 configured to display images is disposed on the front surface side of the backlight unit 10, and a bezel 22 is placed on the further front surface side of the liquid crystal display panel 21. Moreover, although not shown, on the back surface side of the chassis 11, a control circuit substrate configured to control the liquid crystal display panel 21 is disposed, and a control circuit substrate cover covering the control circuit substrate is placed.

Moreover, the backlight unit 10 includes support pins 52 attached and fixed to the chassis 11 via the reflection sheet 27 to support the light diffuser 20 when the light diffuser 20 curves.

As shown in FIGS. 1 and 2, for example, four holder portions 51 configured to hold the light sources 12 and one support pin 52 are formed in one piece on a base member 53 to protrude therefrom. The four holder portions 51 are disposed on the base member 53 at predetermined intervals, and have tips formed in a bifurcated-hook shape so that the tubular light sources 12 are inserted therein. The support pin 52 is preferably formed in a conical shape having an oval cross section. Between adjacent holder parts 51, one support pin 52 is provided.

Units each including the holder portions 51, the support pin 52, and the base member 53 are made of, for example, a polycarbonate resin, or the like, and are disposed, for example, in two rows in a zigzag pattern as shown in FIG. 2. Note that a gap is provided between the light diffuser 20 which is not thermally expanded and tips of the support pins 52.

The backlight unit 10 of Preferred Embodiment 1 includes, as shown in FIGS. 3, 4, and 7, an air passage 45 through which air for cooling the light sources 12 flows. The light sources 12 are disposed inside the air passage 45, whereas the light diffuser 20 is disposed outside the air passage 45. Moreover, at least a portion of the air passage 45 is partitioned by a partition 46 transparent to light of the light sources 12. The partition 46 can be, for example, the diffusion sheet 46.

The air passage 45 of Preferred Embodiment 1 is partitioned by the diffusion sheet 46 and the chassis 11. That is, the light sources 12 are composed of, for example, cylindrical hot cathode fluorescent lamps. Meanwhile, as shown in FIG. 7, the diffusion sheet 46 extends in a direction along an axis parallel or substantially parallel to axes of the light sources 12 (in FIG. 7, an axis extending in a direction perpendicular or substantially perpendicular to the paper, and in FIGS. 3 and 4, an axis extending in the horizontal direction) with the diffusion sheet 46 being curved around the axis parallel or substantially parallel to the axes of the light sources 12. Both end sections in the width direction of the diffusion sheet 46 are connected to the bottom surface 11a of the chassis 11 to form the air passage 45 in a tubular shape. Meanwhile, between the diffusion sheet 46 and the light diffuser 20, a predetermined gap 44 is provided.

Moreover, as shown in FIGS. 3 and 4, on both of the edges of the chassis 11, the fans 47 configured to supply air to the air passage 45 are placed. The fans 47 are cross-flow-type blower fans. As shown in an enlarged view in FIG. 5, both end sections of the air passage 45 are closed by placing the fans 47. As shown in FIGS. 5 and 6, on both of the edges of the chassis 11, the cover members 13 serving as structural members which are of a comb-shaped cross-section are provided.

Each cover member 13 includes comb-shaped parts 13a extending perpendicular or substantially perpendicular to the bottom surface 11a of the chassis 11. The light source holders 31 are configured to be inserted individually between the comb-shaped parts 13a of the cover member 13. Moreover, as shown in FIGS. 5 and 6, a lower end of the cover member 13 abuts on and is supported by the bottom surface 11a of the chassis 11, whereas a lower surface of the light diffuser 20 abuts on and is supported by an upper end of the cover member 13. Note that the light source holders 31 each include, as shown in FIGS. 5 and 6, a protrusion 31a protruding downward, and the protrusions 31a are inserted in through holes formed in the bottom surface 11a of the chassis 11 to attach and fix the light source holders 31 to the chassis 11.

The chassis 11 includes an air outlet 48 formed substantially at the center of the bottom surface 11a. The air outlet 48 is an opening formed by pushing part of the bottom surface 11a to the outside. Moreover, as shown in FIG. 1, the reflection sheet 27 includes an opening 49 formed in a region which faces the air outlet 48 when the reflection sheet 27 is laid on the bottom surface 11a of the chassis 11. Air output from the fans 47 flows, as indicated by arrows in FIG. 3, from both the right and left sides of the chassis 11 through the air passage 45 to the air outlet 48 at the center, so that the light sources 12 are directly cooled. The air passed through the air passage 45 is output through the air outlet 48.

Moreover, the light diffuser 20 is disposed such that the light diffuser 20 faces the polarizer 23 attached to the liquid crystal display panel 21, and that the axes of the diffusion sheet 46 and the light sources 12 are perpendicular or substantially perpendicular to the transmission axis of the polarizer 23. In the liquid crystal display device 1 including the backlight unit 10, light output from the backlight unit 10 is controlled by the liquid crystal display panel 21 to display desired images.

Therefore, in Preferred Embodiment 1, the light sources 12 are disposed inside the air passage 45 partitioned by the diffusion sheet 46 serving as a partition and the chassis 11, whereas the light diffuser 20 is disposed outside the air passage 45. This makes it possible to directly cool the light sources 12, and to trap dust contained in air within the air passage 45 apart from the light diffuser. Therefore, the cooling efficiency of the backlight unit 10 can be increased, and degradation of output light of the backlight unit 10 (e.g., degradation of display images in the case of the liquid crystal display device 1) can be reduced.

That is, the inventor made an intensive study of a cooling structure of the back light unit 10. As a result, the inventor discovered that a major cause of degradation of output light (e.g., degradation of display images in the case of a display device including the light source unit) caused by dust in cooling air is the adhesion of the dust to the light diffuser 20 rather than to the light sources 12.

When the backlight unit 10 continues outputting light, the backlight unit 10 itself is heated by the light sources 12. This may degrade the reliability of the device.

However, the backlight unit 10 of Preferred Embodiment 1 includes the air passage 45, in which the light sources 12 are disposed. Therefore, the light sources 12 can be cooled directly and efficiently by air flowing through the air passage 45. Meanwhile, the light diffuser 20 is disposed outside the air passage 45, and thus, even if the air flowing through the air passage 45 contains dust, the dust can be trapped within the air passage 45, as a result of which it is possible to prevent the dust from adhering to the light diffuser 20.

Therefore, the dust contained in the air for cooling the light sources 12 can be trapped apart from the light diffuser 20 close to a user, so that the dust can be inconspicuous for the user. Furthermore, the cooling efficiency of the light sources 12 can be increased, as a result of which the temperature of the light sources 12 is appropriately lowered, which allows the luminous efficiency of the light sources 12 to be increased.

Moreover, the light sources 12 are composed of cylindrical hot cathode fluorescent lamps, whereas the diffusion sheet 46 extends in a direction along the axis parallel or substantially parallel to the axes of the light sources 12 with the diffusion sheet 46 being curved around the axis parallel or substantially parallel to the axes of the light sources 12. Therefore, the axis of the diffusion sheet 46 is coincident with the axes of the light sources 12 so that polarized light output from the cylindrical hot cathode fluorescent lamps can be efficiently transmitted through the diffusion sheet 46. As a result, it is possible to reduce loss of light caused by the diffusion sheet 46 when the light transmitted through the diffusion sheet 46, so that the luminance of the backlight unit 10 can be improved while the power consumption thereof is reduced.

Moreover, in this case, since the axes of the diffusion sheet 46 and the light sources 12 are perpendicular or substantially perpendicular to the transmission axis of the polarizer 23 on the back surface side of the liquid crystal display panel 21, polarized light output from the light diffuser 20 can be efficiently transmitted through the polarizer 23. Therefore, light output from the backlight unit 10 can be efficiently used for liquid crystal display.

Preferred Embodiment 2

Figure 8:
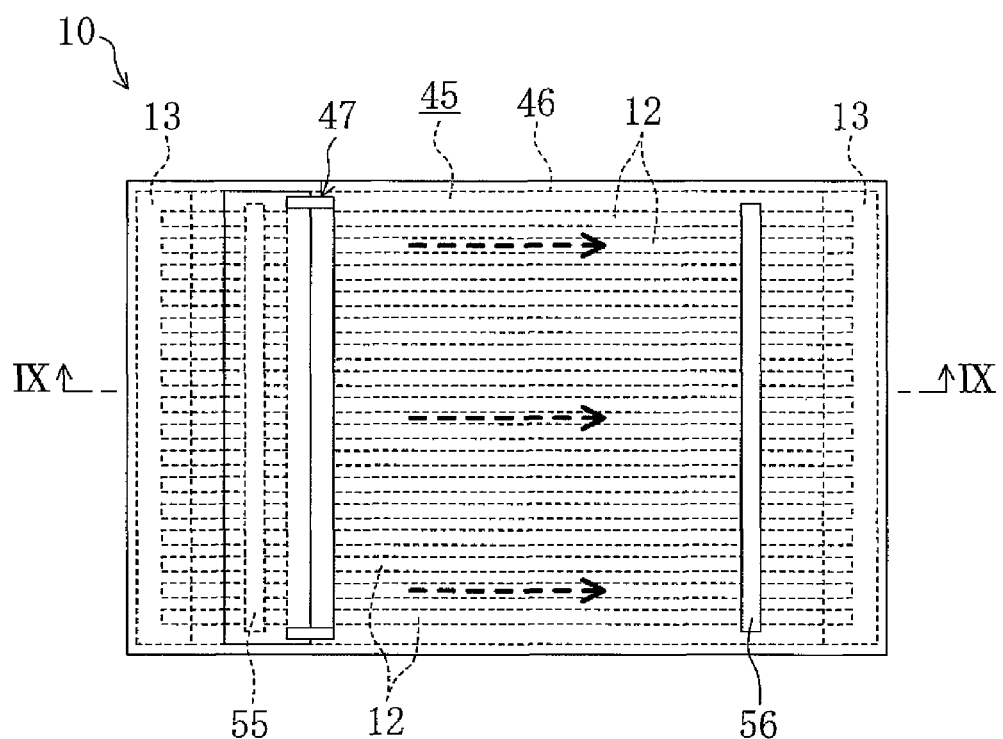
FIG. 8 is a back view showing the appearance of a backlight unit.
Figure 9:
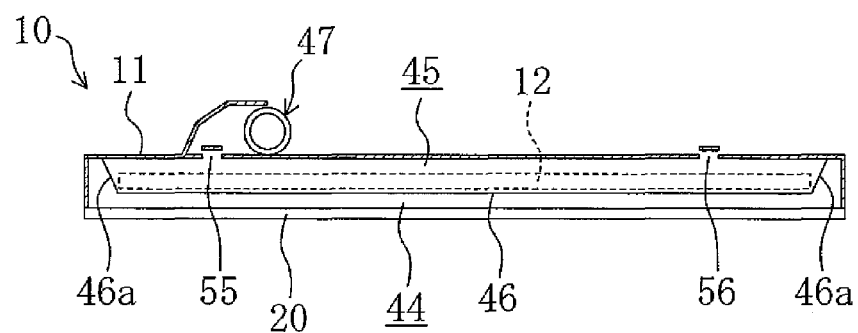
FIG. 9 is a cross-sectional view along the line IX-IX of FIG. 8.

FIGS. 8 and 9 show Preferred Embodiment 2 of the present invention. FIG. 8 is a back view showing the appearance of a backlight unit 10. FIG. 9 is a cross-sectional view along the line IX-IX of FIG. 8. Note that in the following preferred embodiments, the same reference characters as those shown in FIGS. 1-7 are used to represent equivalent elements, and the detailed explanation thereof will be omitted.

In Preferred Embodiment 1, fans 47 are provided on both the right and left edges of the chassis 11 whereas in Preferred Embodiment 2, one fan 47 is provided on a back surface of a chassis 11.

That is, the backlight unit 10 of Preferred Embodiment 2 also includes, as in the case of Preferred Embodiment 1, an air passage 45 partitioned by a diffusion sheet 46 serving as a partition 46 and a bottom surface 11a of the chassis 11. In Preferred Embodiment 1, both the right and left end sections of the air passage 45 are closed with the pair of fans 47, whereas in Preferred Embodiment 2, as shown in FIG. 9, both right and left end sections of the air passage 45 are closed with side portions 46a of the diffusion sheet 46. Moreover, a predetermined gap 44 is formed between the diffusion sheet 46 and a light diffuser 20.

On the bottom surface 11a of the chassis 11, an air inlet 55 arranged to introduce air into the air passage 45 and an air outlet 56 arranged to output the air from the air passage 45 to the outside are formed as through holes. The air inlet 55 and the air outlet 56 are, as shown in FIG. 8, respectively disposed on the right and left portions of the chassis 11 at a predetermined interval, and extend in a width direction of the chassis 11 perpendicular or substantially perpendicular to the axial direction of light sources 12 (the horizontal direction in FIG. 8). Moreover, the air inlet 55 and the air outlet 56 are openings formed by pushing a portion of the bottom surface 11a to the outside in the same manner as for the air outlet 48 of Preferred Embodiment 1. The fan 47 is arranged on the back surface side of the chassis 11 to cover the air inlet 55.

Therefore, in Preferred Embodiment 2, the air passage 45 partitioned by the diffusion sheet 46 and the bottom surface 11a of the chassis 11 is provided, the light sources 12 are disposed inside the air passage 45, and the light diffuser 20 is disposed outside the air passage 45. Therefore, Preferred Embodiment 2 can also provide an effect similar to that of Preferred Embodiment 1.

Furthermore, Preferred Embodiment 2 includes one fan 47, so that the cost of the device can be lowered. Moreover, since the fan 47 is disposed on the back surface side of the chassis 11, the contour of the backlight unit 10 and the liquid crystal display device 1 viewed from the front surface side can be smaller than that of Preferred Embodiment 1 in which the fans 47 are provided on both the right and left edges of the chassis 11.

Preferred Embodiment 3

Figure 10:
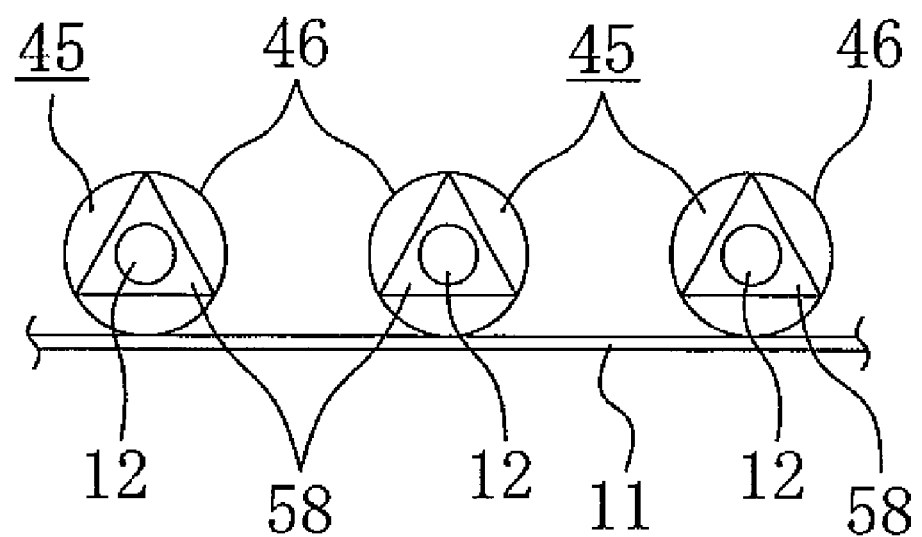
FIG. 10 is an enlarged cross-sectional view showing light sources and air passages.

FIG. 10 shows Preferred Embodiment 3 of the present invention. FIG. 10 is an enlarged cross-sectional view of light sources 12 and air passages 45.

In Preferred Embodiment 1, all the plurality of light sources 12 are covered with one air passage 45, whereas in Preferred Embodiment 3, the air passages 45 are provided for the respective ones of the light sources 12.

That is, as shown in FIG. 10, the light sources 12 are composed of, for example, cylindrical hot cathode fluorescent lamps. A diffusion sheet 46 serving as a partition is provided for each of the light sources 12. The diffusion sheets 46 are formed in a cylindrical shape extending in the axial direction of the light sources 12 (that is, the direction vertical to the paper of FIG. 10). The air passages 45 are partitioned by the diffusion sheets 46 formed in a tubular shape.

Each light source 12 is fixed to the inner surface of the cylindrical diffusion sheet 46 via a spacer 58. As shown in FIG. 10, the spacer 58 is preferably defined by, for example, a member having a triangle-plate shape. The light source 12 is fit into a through hole formed in the center of the spacer 58. Tips, i.e., three vertices of the spacer 58 lie on the inner surface of the diffusion sheet 46.

A fan (not shown) is provided at one edge of the chassis 11, and air is supplied from the fan to the air passages 45. Moreover, at the other edge of the chassis 11, an air outlet (not shown) is formed. In this way, the air supplied from the fan and flowing through the air passages 45 cools the light sources 12 individually, and the air can be output through the air outlet.

Therefore, in Preferred Embodiment 3, the air passages 45 partitioned by the diffusion sheets 46 are provided, the light sources 12 are each disposed inside the air passages 45, and the light diffuser 20 is disposed outside the air passages 45. Therefore, Preferred Embodiment 3 can also provide an effect similar to that of Preferred Embodiment 1.

Furthermore, since the plurality of light sources 12 are individually disposed inside the air passages 45, it can be ensured that dust contained in air is prevented from scattering. Moreover, since the axial direction of the cylindrical diffusion sheets 46 is coincident with the axial direction of the cylindrical light sources 12, polarized light output from the light sources 12 can be transmitted effectively through the diffusion sheets 46. That is, the luminance of output light of a backlight unit 10 can be further increased.

Other Preferred Embodiments

In the preferred embodiments above, examples employing the diffusion sheet 46 as a partition 46 have been described. However, the present invention it not limited to these examples, but may employ other members transparent to light of a light source. Note that, in terms of promoting the diffusion of light of the light sources 12, as described above, the diffusion sheet 46 is preferably employed as the partition 46.

Moreover, in the above-described preferred embodiments, for example, between the liquid crystal display panel 21 and the light diffuser 20, a polarization-reflection-type selective reflection sheet may be disposed to face the light diffuser. The selective reflection sheet is a sheet which reflects or is transparent to incident, non-polarized light depending on the polarization axis thereof. As the selective reflection sheet, for example, DBEF, DBEF-D, or the like of Sumitomo 3M Limited may be employed. Here, it is preferable that the transmission axis of the selective reflection sheet is perpendicular or substantially perpendicular to the axes of the partition and the light sources. In this way, the polarization direction of light transmitted through the selective reflection sheet is coincident with the polarization direction of a P-polarized component for the partition (a component less reflected at an interface to the partition), which makes it possible to increase the amount of output light. That is, the transmission axis of the selective reflection sheet is coincident with the transmission axis of the partition to allow the amount of light transmitted through the selective reflection sheet to be increased.

As described above, preferred embodiments of the present invention are useful for light source units and display devices, and in particular, suitable to the case of increasing the cooling efficiency of light source units and reducing degradation of output light.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A light source unit comprising:
a chassis;
a light diffuser disposed to face the chassis;
a light source disposed between the light diffuser and the chassis; and
an air passage through which air used in cooling the light source flows; wherein
the light source is disposed inside the air passage and the light diffuser is disposed outside the air passage; and
at least a portion of the air passage is partitioned by a partition that is transparent to light of the light source, the partition having a tubular shape.

2. The light source unit of claim 1, wherein the light source includes a cylindrical lamp, and the partition includes a sheet material extending in a direction of an axis parallel or substantially parallel to an axis of the light source with the sheet material being curved around the axis parallel or substantially parallel to the axis of the light source.

3. The light source unit of claim 2, wherein the light diffuser is disposed to face a polarizer attached to a display panel, and the axes of the light source and the partition are perpendicular or substantially perpendicular to a transmission axis of the polarizer.

4. The light source unit of claim 2, further comprising a polarization-reflection-type selective reflection sheet disposed to face the light diffuser, wherein a transmission axis of the polarization-reflection-type selective reflection sheet is perpendicular or substantially perpendicular to the axes of the partition and the light source.

5. The light source unit of claim 1, wherein the light source includes a cylindrical lamp, and the partition includes a cylindrical sheet material extending in an axial direction of the light source.

6. A display device comprising:
a display panel; and
a light source unit disposed to face the display panel; wherein
the light source unit includes a chassis, a light diffuser disposed to face the chassis, a light source disposed between the light diffuser and the chassis, and an air passage through which air used in cooling the light source flows;
the light source is disposed inside the air passage and the light diffuser is disposed outside the air passage; and
at least a portion of the air passage is partitioned by a partition that is transparent to light of the light source, the partition having a tubular shape.

7. The display device of claim 6, comprising multiple ones of the light source, wherein multiple ones of the partition are provided for respective ones of the light sources.

8. The display device of claim 6, wherein the light source includes a cylindrical lamp, and the partition includes a cylindrical sheet material extending in an axial direction of the light source.

9. The display device of claim 6, wherein the display panel includes a polarizer attached to a surface of the display panel facing the light diffuser, and the axes of the partition and the light source are perpendicular or substantially perpendicular to a transmission axis of the polarizer.

* * * * *